US011060584B2

(12) United States Patent
Ronchiato et al.

(10) Patent No.: US 11,060,584 B2
(45) Date of Patent: Jul. 13, 2021

(54) GEAR ASSEMBLY MOUNT FOR GAS TURBINE ENGINE

(71) Applicants: General Electric Company, Schenectady, NY (US); GE Avio S.r.l., Rivalta di Torino (IT)

(72) Inventors: Luca Ronchiato, Porte (IT); Michele Gravina, Minervino Murge (IT); Joseph Robert Dickman, Baltimore, MD (US)

(73) Assignees: GE AVIO S.R.L., Rivalta di Torino (IT); GENERAL ELECTRIC COMPANY, Schenectady, NY (US)

( * ) Notice: Subject to any disclaimer, the term of this patent is extended or adjusted under 35 U.S.C. 154(b) by 49 days.

(21) Appl. No.: 16/425,062

(22) Filed: May 29, 2019

(65) Prior Publication Data
US 2019/0368577 A1 Dec. 5, 2019

(30) Foreign Application Priority Data

May 29, 2018 (IT) .................. 102018000005822

(51) Int. Cl.
*F01D 25/28* (2006.01)
*F16H 1/48* (2006.01)
(Continued)

(52) U.S. Cl.
CPC ............... *F16H 1/48* (2013.01); *F01D 25/28* (2013.01); *F02C 3/04* (2013.01); *F02C 7/36* (2013.01);
(Continued)

(58) Field of Classification Search
CPC ... F16H 1/48; F01D 25/28; F05D 2260/04311
See application file for complete search history.

(56) References Cited

U.S. PATENT DOCUMENTS 3,902,822 A 9/1975 Andrews et al.
4,484,447 A * 11/1984 Gueraud ................. F01K 11/02
165/69

(Continued)

FOREIGN PATENT DOCUMENTS

EP 2535528 A2 12/2012

OTHER PUBLICATIONS

Italian Search Report Corresponding to Application No. 201800005822 dated Jan. 22, 2019.

*Primary Examiner* — Ninh H. Nguyen
(74) *Attorney, Agent, or Firm* — Venable LLP; Michele V. Frank

(57) ABSTRACT

A gas turbine engine including a first frame including a first mount member defining a stiffness $K_1$; a second frame including a second mount member defining a stiffness $K_2$ and a third mount member defining a stiffness $K_3$; and a gear assembly. The gear assembly includes a first rotatable component, a second rotatable component, and a torque transfer component. The first mount member is coupled to the first rotatable component. The second mount member is coupled to the second rotatable component. The third mount member is coupled to the torque transfer component. The stiffness $K_1$ is less than or equal to 10% of the stiffness $K_3$.

18 Claims, 3 Drawing Sheets

(51) Int. Cl.
*F02C 3/04* (2006.01)
*F02C 7/36* (2006.01)
*F02K 3/06* (2006.01)

(52) U.S. Cl.
CPC ............ *F02K 3/06* (2013.01); *F05D 2220/32* (2013.01); *F05D 2260/30* (2013.01); *F05D 2260/40311* (2013.01)

(56) References Cited

U.S. PATENT DOCUMENTS

| | | |
|---|---|---|
| 5,433,674 A | 7/1995 | Sheridan et al. |
| 7,591,754 B2 | 9/2009 | Duong et al. |
| 8,297,916 B1 | 10/2012 | McCune et al. |
| 8,517,672 B2 | 8/2013 | McCooey |
| 8,747,055 B2 | 6/2014 | McCune et al. |
| 8,814,503 B2 | 8/2014 | McCune et al. |
| 8,974,344 B2 | 3/2015 | McCune et al. |
| 9,046,041 B2 | 6/2015 | Rejman et al. |
| 9,091,328 B2 | 7/2015 | Sheridan et al. |
| 9,416,734 B2 | 8/2016 | Thies et al. |
| 9,523,422 B2 * | 12/2016 | McCune .................. F02C 7/36 |
| 2017/0356347 A1 | 12/2017 | Scothern et al. |
| 2018/0128186 A1 | 5/2018 | Sheridan et al. |
| 2019/0285029 A1 * | 9/2019 | Nick ........................ G01L 1/02 |

\* cited by examiner

GEAR ASSEMBLY MOUNT FOR GAS TURBINE ENGINE

FIELD

The present subject matter relates generally to gas turbine engines including power or reduction gear assemblies.

BACKGROUND

Geared gas turbine engines generally include a power or reduction gear assembly between a propeller or fan assembly and a core engine. During operation of the engine, external loads on the engine structure will cause relative motion of the components of the gear assembly. When these components do not move together, they introduce an uneven load share between gears within the gear assembly, thereby causing an overload condition at one or more of the gears. Additionally, or alternatively, such uneven load sharing may cause clearance closure between the gear assembly components. Such undesired uneven load sharing may result in gear assembly failure and, consequently, engine failure. Furthermore, the risk of clearance closure between the gears limits the magnitude of the allowed relative motions, thereby necessitating stiffer and heavier structures thus reducing engine efficiency.

As such, there is a need for mount arrangements that may mitigate undesired load transfer, clearance closures, and improve engine efficiency.

BRIEF DESCRIPTION

Aspects and advantages of the invention will be set forth in part in the following description, or may be obvious from the description, or may be learned through practice of the invention.

An aspect of the present disclosure is directed to a gas turbine engine including a first frame including a first mount member defining a stiffness $K_1$; a second frame including a second mount member defining a stiffness $K_2$ and a third mount member defining a stiffness $K_3$; and a gear assembly. The gear assembly includes a first rotatable component, a second rotatable component, and a torque transfer component. The first mount member is coupled to the first rotatable component. The second mount member is coupled to the second rotatable component. The third mount member is coupled to the torque transfer component. The stiffness $K_1$ is less than or equal to 10% of the stiffness $K_3$.

In one embodiment, a ratio of stiffness $K_2/K_3$ is greater than approximately 0.5 and less than approximately 2.0.

In various embodiments, the first rotatable component of the gear assembly defines an input component providing torque to the gear assembly. In one embodiment, the second rotatable component of the gear assembly defines an output component receiving torque from the first rotatable component via the torque transfer component.

In still various embodiments, the second rotatable component of the gear assembly defines an input component providing torque to the gear assembly. In one embodiment, the first rotatable component of the gear assembly defines an output component receiving torque from the second rotatable component via the torque transfer component.

In various embodiments, the gear assembly defines an epicyclical gear assembly. In one embodiment, the torque transfer component of the gear assembly defines a ring gear or a planet carrier generally stationary relative to a gear assembly centerline defined through an input component. In another embodiment, the input component comprises a sun gear. In yet another embodiment, the gear assembly defines an output component comprising a planet gear rotatable around a gear assembly centerline defined through an input component.

In still various embodiments, the engine further includes a turbine section coupled to the gear assembly. The turbine section provides a motive force to rotate the first rotatable component and the second rotatable component. In one embodiment, the engine further includes a fan section coupled to the gear assembly. In one embodiment, the fan section receives the motive force from the first rotatable component and the second rotatable component.

In one embodiment, the engine defines a turbofan, turboshaft, or turboprop configuration.

In another embodiment, the first mount member is coupled to the first rotatable component and the second mount member is coupled to the second rotatable component each via a bearing assembly.

Another aspect of the present disclosure is directed to a gas turbine engine including a turbine section, a fan section, a gear assembly, an input mount frame, an output mount frame, and a torque transfer mount member. The gear assembly includes an input component rotatable around a gear assembly centerline, an output component rotatable around the gear assembly centerline, and a torque transfer component coupled to one or more of the input component or the output component. The turbine section is coupled to the input component and the fan section is coupled to the output component. The input mount frame includes an input mount member defining a stiffness $K_{input}$ coupled to the input component. The output mount frame includes an output mount member defining a stiffness $K_{output}$ coupled to the output component. The torque transfer mount member defines a stiffness $K_3$. The torque transfer mount member is coupled to the torque transfer component and the input mount frame. The stiffness $K_{output}$ of the output mount member is equal to or less than 10% of the stiffness $K_3$ of the torque transfer mount member.

In one embodiment, a ratio of stiffness $K_{input}/K_3$ is between approximately 0.5 and approximately 2.0.

In another embodiment, the input mount member, the torque transfer mount member, and the input mount frame together define an overall stiffness at least ten times greater than the stiffness $K_{output}$.

Yet another aspect of the present disclosure is directed to a gas turbine engine including a turbine section, a fan section, a gear assembly, an input mount frame, an output mount frame, and a torque transfer mount member. The gear assembly includes an input component rotatable around a gear assembly centerline, an output component rotatable around the gear assembly centerline, and a torque transfer component coupled to one or more of the input component or the output component. The turbine section is coupled to the input component and the fan section is coupled to the output component. The input mount frame includes an input mount member defining a stiffness $K_{input}$ coupled to the input component. The output mount frame includes an output mount member defining a stiffness $K_{output}$ coupled to the output component. The torque transfer mount member defines a stiffness $K_3$. The torque transfer mount member is coupled to the torque transfer component and the output mount frame. The stiffness $K_{input}$ of the input mount member is equal to or less than 10% of the stiffness $K_3$ of the torque transfer mount member.

In one embodiment, a ratio of stiffness $K_{output}/K_3$ is between approximately 0.5 and approximately 2.0.

In another embodiment, the output mount member, the torque transfer mount member, and the output mount frame together define an overall stiffness at least ten times greater than the stiffness $K_{input}$.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
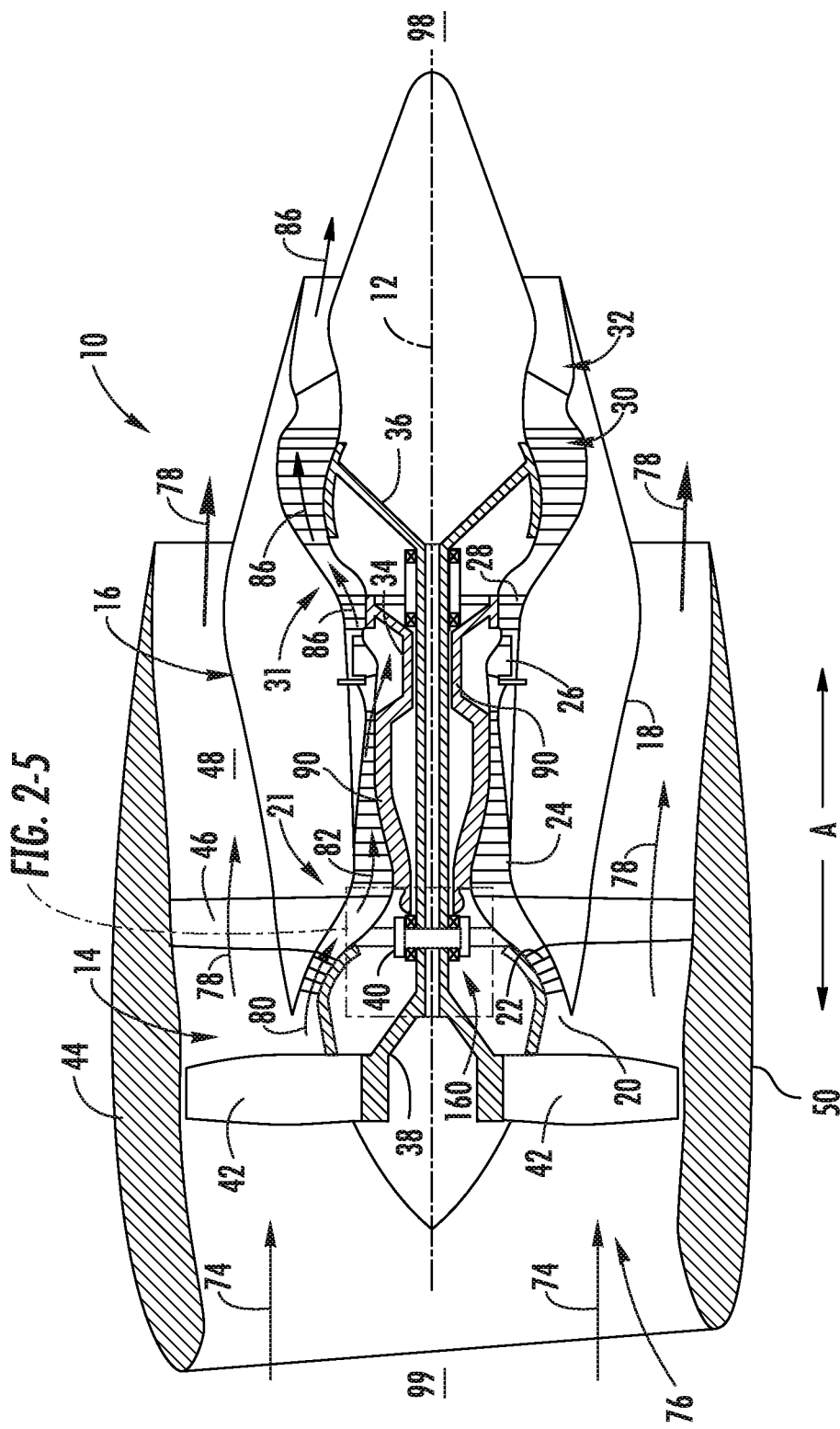
FIG. 1 is an exemplary embodiment of a turbine engine including a gear assembly mount arrangement according to an aspect of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Approximations recited herein may include margins based on one or more measurement devices as used in the art, such as, but not limited to, a percentage of a full scale measurement range of a measurement device or sensor. Alternatively, approximations recited herein may include margins of 10% of an upper limit value greater than the upper limit value or 10% of a lower limit value less than the lower limit value.

Embodiments of mount arrangements of a gear assembly for a turbine engine are generally provided. Embodiments of mount arrangements generally shown and described herein include a first rotatable component, a second rotatable component, and a torque transfer component of a gear assembly mounted independently from two frames (i.e., a first frame and a second frame). Such arrangements enable the first rotatable component to float or otherwise mount independently with relatively low stiffness to the first frame, relative to the second rotatable component and the torque transfer component mounted to the second frame. The second rotatable component and the torque transfer component are mounted from the second frame substantially rigid along one or more of a radial, a pitch, or a yaw direction. Substantially constraining the second rotatable component and the torque transfer component to the same frame (i.e., the second frame) so that they are constrained to move or not move together, while enabling movement or floating of the first rotatable component mounted independently to the first frame, mitigates uneven load sharing between the components at the first frame versus the second frame. As such, mitigating uneven load sharing across components may further mitigate overload conditions at the gear assembly. Additionally, or alternatively, clearances at the gear assembly may be reduced, or undesired clearance closures may be mitigated, such as to improve power density and enable relatively larger loads or thrusts to operate at relatively smaller gear assemblies.

Referring now to the drawings, FIG. 1 is a schematic partially cross-sectioned side view of an exemplary gas turbine engine 10 herein referred to as "engine 10" as may incorporate various embodiments of the present invention. Although generally depicted herein as a turbofan configuration, the engine 10 shown and described herein may further define a turboprop or turboshaft configuration. As shown in FIG. 1, the engine 10 has a longitudinal or axial centerline axis 12 that extends there through for reference purposes. In general, the engine 10 may include a propeller or fan assembly 14 and a core engine 16 disposed downstream of the fan assembly 14.

The core engine 16 may generally include a substantially tubular outer casing 18 that defines an annular inlet 20. The outer casing 18 encases or at least partially forms, in serial flow relationship, a compressor section 21 having a booster or low pressure (LP) compressor 22, a high pressure (HP) compressor 24, and/or one or more intermediate pressure (IP) compressors (not shown) disposed aerodynamically between the LP compressor 22 and the HP compressor 24; a combustion section 26; a turbine section 31 including a high pressure (HP) turbine 28, a low pressure (LP) turbine 30, and/or one or more intermediate pressure (IP) turbines (not shown) disposed aerodynamically between the HP turbine 28 and the LP turbine 30; and a jet exhaust nozzle section 32. A high pressure (HP) rotor shaft 34 drivingly connects the HP turbine 28 to the HP compressor 24. A low pressure (LP) rotor shaft 36 drivingly connects the LP turbine 30 to the LP compressor 22. In other embodiments incorporating an IP turbine and an IP compressor, an IP rotor shaft drivingly connects the IP turbine to the IP compressor (not shown). The LP rotor shaft 36 may also, or alternatively, be connected to a fan shaft 38 of the fan assembly 14. In particular embodiments, such as shown in FIG. 1, the LP shaft 36 may be connected to the fan shaft 38 via a power or reduction gear assembly 40 such as in an indirect-drive or geared-drive configuration.

Combinations of the compressors 22, 24, the turbines 28, 30, and the shafts 34, 36, 38 each define a rotor assembly 90 of the engine 10. For example, in various embodiments, the LP turbine 30, the LP shaft 36, the fan assembly 14 and/or the LP compressor 22 together define the rotor assembly 90 as a low pressure (LP) rotor assembly. The rotor assembly 90 may further include the fan rotor 38 coupled to the fan assembly 14 and the LP shaft 36 via the gear assembly 40. As another example, the HP turbine 28, the HP shaft 34, and the HP compressor 24 may together define the rotor assembly 90 as a high pressure (HP) rotor assembly. It should further be appreciated that the rotor assembly 90 may be defined via a combination of an IP compressor, an IP turbine, and an IP shaft disposed aerodynamically between the LP rotor assembly and the HP rotor assembly.

Figure 2:
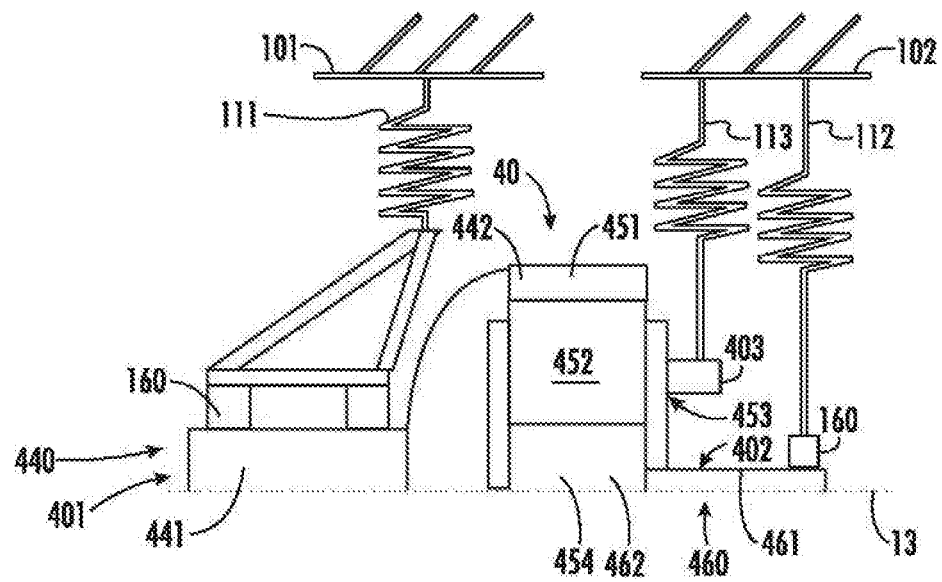
FIGS. 2-5 are exemplary embodiments of a gear assembly mount arrangement according to aspects of the present disclosure.

In still various embodiments, the rotor assembly 90 further includes a bearing assembly 160 enabling rotation of the shaft (e.g., shaft 34, 36, 38) relative to a surrounding grounding or static structure (e.g., outer casing 18), such as further shown and described in regard to FIG. 2.

As shown in FIG. 1, the fan assembly 14 includes a plurality of fan blades 42 that are coupled to and that extend radially outwardly from the fan shaft 38. An annular fan casing or nacelle 44 circumferentially surrounds the fan assembly 14 and/or at least a portion of the core engine 16. It should be appreciated by those of ordinary skill in the art that the nacelle 44 may be configured to be supported relative to the core engine 16 by a plurality of circumferentially-spaced outlet guide vanes or struts 46. Moreover, at least a portion of the nacelle 44 may extend over an outer portion of the core engine 16 so as to define a bypass airflow passage 48 therebetween.

Referring to FIGS. 2-5, schematic views of a portion of the engine 10 are generally provided. The gear assembly 40 includes a first rotatable component 401, a second rotatable component 402, and a torque transfer component 403. The torque transfer component 403 is coupled to the first rotatable component 401, the second rotatable component 402, or both. In various embodiments, the gear assembly 40 defines an epicyclical gear assembly.

Referring still to FIGS. 2-5, the engine 10 includes a first frame 101 including a first mount member 111 defining a stiffness $K_1$. The engine 10 further includes a second frame 102 including a second mount member 112 defining a stiffness $K_2$ and a third mount member 113 defining a stiffness $K_3$. The first mount member 111 is coupled to the first rotatable component 401. The second mount member 112 is coupled to the second rotatable component 402 and the third mount member 113 is coupled to the torque transfer component 403. In various embodiments, the stiffness $K_1$ is less than or equal to 10% of the stiffness $K_3$. In still various embodiments, a ratio of stiffness $K_2/K_3$ is greater than approximately 0.5 and less than approximately 2.0.

In the embodiments generally shown and described in regard to FIGS. 2-5, the first frame 101 is substantially independent of the second frame 102 in regard to relative stiffness properties. For example, the first frame 101 generally defines a separate grounding structure from the second frame 102. As another example, the relative stiffnesses (e.g., $K_1$, $K_2$, $K_3$) are distributed through the frames 101, 102 such as schematically shown and described herein. In various embodiments, the first frame 101 and the second frame 102 are coupled together or otherwise assembled, such as, but not limited to, via mechanical fasteners or joining methods. In still various embodiments, the second frame 102, the second mount member 112, and the third mount member 113 together define an overall stiffness at least ten times greater than that of the first mount member 111. As such, the second mount member 112 and the third mount member 113 each define a relatively stiff or rigid support structure to the second rotatable component 402 and torque transfer component 403. In contrast, the first mount member 111 defines a relatively flexible support structure to the first rotatable component 401.

Referring still to FIGS. 2-5, embodiments of the engine 10 which include mount arrangements of the gear assembly 40 such that the first rotatable component 401, the second rotatable component 402, and the torque transfer component 403 are mounted from the two frames (i.e., first frame 101 and second frame 102) enables the first rotatable component 401 to float or otherwise be mounted independently with relatively low stiffness at the first frame 101. Mounting the first rotatable component 401 to the first frame 101 defines a lower stiffness relative to mounting the second rotatable component 402 and the torque transfer component 403 from the second frame 102. The second rotatable component 402 and the torque transfer component 403 mounted from the second frame 102 provides a substantially rigid stiffness along one or more of a radial, a pitch, or a yaw direction. Substantially constraining the second rotatable component 402 and the torque transfer component 403 to the same frame (i.e., second frame 102) such as to move or not move together, while enabling movement or floating of the first rotatable component 401 mounted independently to the first frame 101 mitigates uneven load sharing between the components 401, 402, 403. As such, mitigating load sharing across components 401, 402, 403 may further mitigate overload conditions. Additionally, or alternatively, clearances at the gear assembly 40 may be reduced such as to improve power density and enable relatively larger loads or thrusts to be carried and transmitted using relatively smaller gear assemblies.

Figure 3:
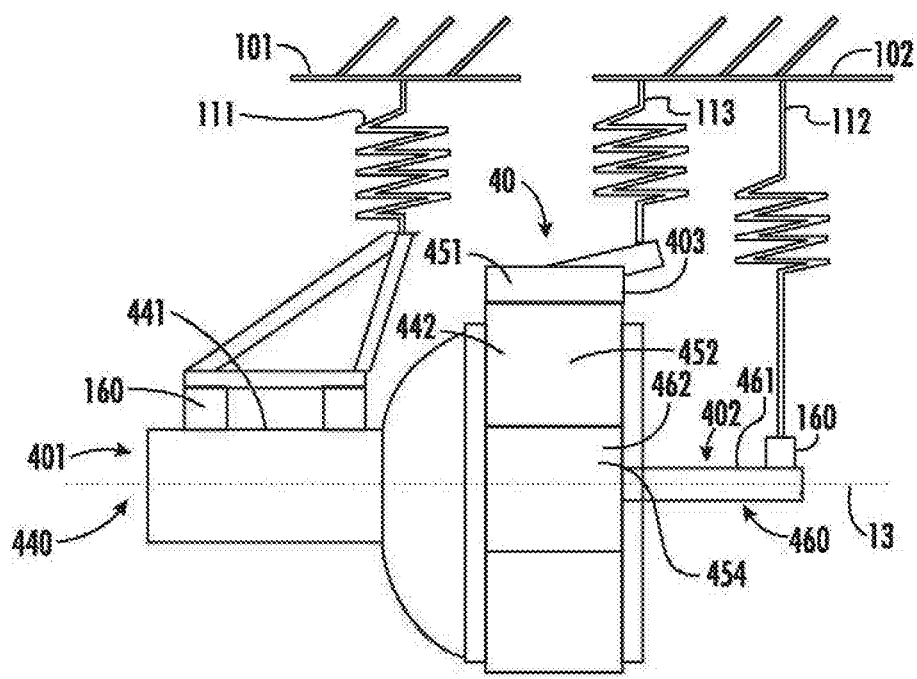

Referring to FIGS. 2-3, exemplary embodiments of the engine 10 are generally provided in which the first rotatable component 401 defines an output component 440 of the gear assembly 40. The output component 440 may generally include an output shaft 441. The output shaft 441 is coupled to the fan section 14 (FIG. 1). For example, the output shaft 441 may at least partially define the fan shaft 38 (FIG. 1) coupled to the plurality of fan blades 42 (FIG. 1).

Referring still to FIGS. 2-3, the output component 440 may further include an output gear 442 coupled to the output shaft 441.

In one embodiment, such as generally provided in FIG. 2, the output gear 442 may define a ring gear 451 rotatable around a gear assembly centerline 13 of the gear assembly 40. The torque transfer component 403 may define a planet gear 452 and carrier 453 fixed circumferentially relative to the first rotatable component 401 and the second rotatable component 402. The third mount member 113 is coupled to the torque transfer component 403 including the carrier 453. As such, the third mount member 113 fixes the torque transfer component 403 in static arrangement relative to the first rotatable component 401 and the second rotatable component 402.

In another embodiment, such as generally provided in FIG. 3, the output gear 442 may define a planet gear 452 rotatable around the gear assembly centerline 13. The torque transfer component 403 may be defined by the ring gear 451 fixed circumferentially relative to the first rotatable component 401 and the second rotatable component 402. The third mount member 113 is coupled to the torque transfer component 403 including the ring gear 451. As such, the third mount member 113 fixes the ring gear 451 defining the torque transfer component 403 in static arrangement relative to the first rotatable component 401 and the second rotatable component 402.

Referring back to FIGS. 2-3, the second rotatable component 402 defines an input component 460 of the gear assembly 40. The input component 460 may generally include an input shaft 461. In one embodiment, the input shaft 461 defines the LP shaft 36, such as providing power from the LP turbine 30 to drive the fan assembly 14 (FIG.

1). It should be appreciated that in other embodiments, the input shaft 461 may define any drive shaft of the engine 10, such as, the HP shaft 34 (FIG. 1), or one or more IP shafts (not shown).

Referring still to FIGS. 2-3, the input component 460 may further include an input gear 462 coupled to the input shaft 461. In various embodiments, the input gear 462 may define a sun gear 454 rotatable relative to the gear assembly centerline 13 of the gear assembly 40. The input component 460 including the input shaft 461 and input gear 462 defining the sun gear 454 enables rotation of the output shaft 441 via power, torque, or motive force generally transferred from the turbine section 31 (e.g., by virtue of the LP turbine 30 being coupled to the LP shaft 36, with the LP shaft 36 defining the input shaft 461) through the output gear 442. As further described above, in various embodiments the output gear 442 may include the ring gear 451 (FIG. 2) or the planet gear 452 (FIG. 3) acting against the torque transfer component 403 to enable transfer of power or torque to the output shaft 441.

As generally shown in the embodiments in regard to FIGS. 2-3, the first frame 101 including the first mount member 111 is coupled to the first rotatable component 401 defining the output component 440 of the gear assembly 40. In one embodiment, the first rotatable component 401 defining, at least in part, the output shaft 441 may be coupled to the first frame 101 via the first mount member 111 and the bearing assembly 160. As further depicted in regard to FIGS. 2-3, the second frame 102 including the second mount member 112 is coupled to the second rotatable component 402 defining the input component 460 of the gear assembly 40. In one embodiment, the second rotatable component 402 defining, at least in part, the input shaft 461 may be coupled to the second frame 102 via the second mount member 112 and the bearing assembly 160.

Additionally, the second frame 102 including the third mount member 113 is coupled to the torque transfer component 403. As further depicted in regard to FIG. 2, the second frame 102 including the third mount member 113 is coupled to the torque transfer component 403 including the carrier 453. In another embodiment, such as depicted in regard to FIG. 3, the second frame 102 including the third mount member 113 is coupled to the torque transfer component 403 including the ring gear 451.

Referring still to FIGS. 2-3, the second frame 102 may generally define an input mount frame. The second mount member 112 may generally define an input mount member defining a stiffness $K_{input}$. The second mount member 112 defining the input mount member is coupled to the input component 460, such as described above. The first frame 101 may generally define an output mount frame. The first mount member 111 may generally define an output mount member defining a stiffness $K_{output}$. The first mount member 111 defining the output mount member is coupled to the output component 440, such as described above. The third mount member 113 may generally define a torque transfer mount member defining a stiffness $K_3$ and is coupled to the torque transfer component 403 of the gear assembly 40 and to the second frame 102 defining the input mount frame. The stiffness $K_{output}$ of the first mount member 111 defining the output mount member is equal to or less than 10% of the stiffness $K_3$ of the third mount member 113 defining the torque transfer mount member. In various embodiments, a ratio of stiffness $K_{input}/K_3$ is between approximately 0.5 and approximately 2.0. In still various embodiments, second mount member 112 defining the input mount member, third mount member 113 defining the torque transfer mount member, and the second frame 102 defining the input mount frame together define an overall stiffness at least ten times greater than the stiffness $K_{output}$ of the first mount member 111.

Figure 4:
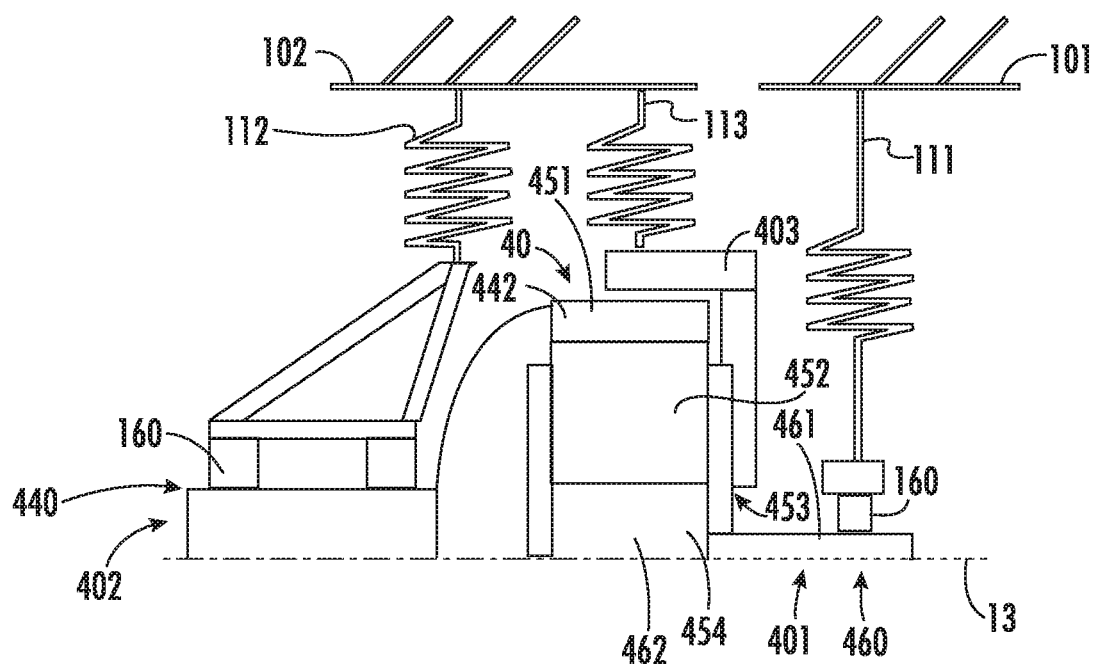
Figure 5:
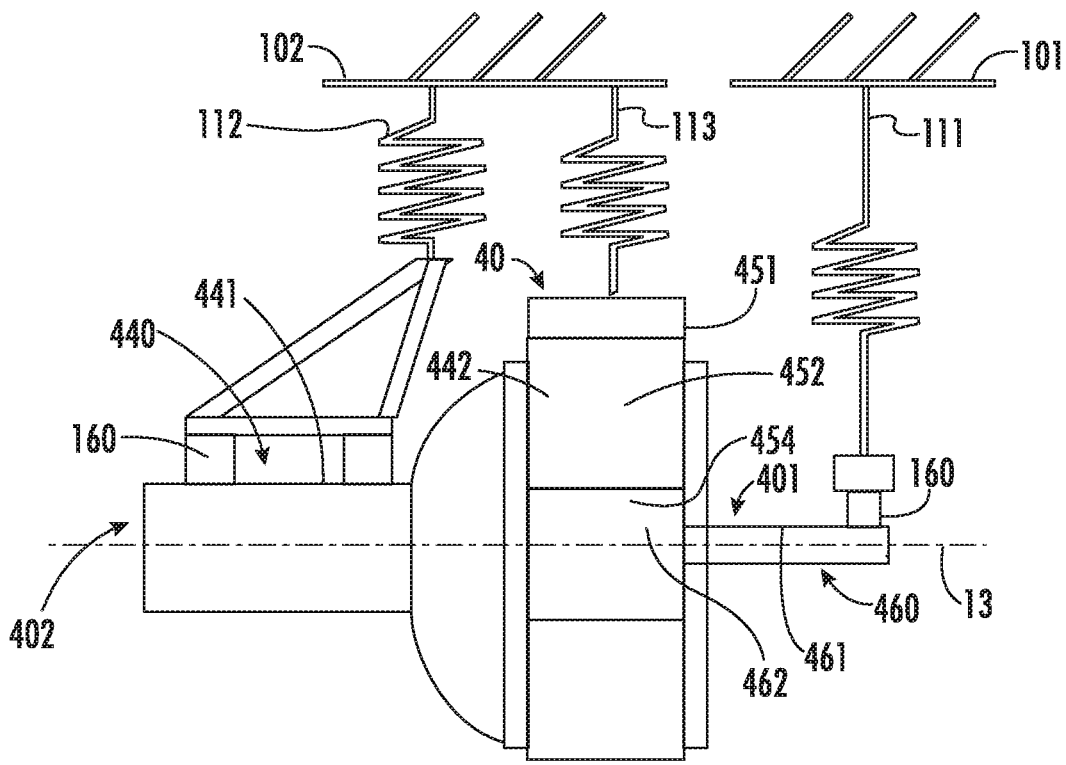

Referring now to FIGS. 4-5, exemplary embodiments of the engine 10 are generally provided in which the first rotatable component 401 defines the input component 460 of the gear assembly 40. The input component 460 may generally include the input shaft 461, such as described in regard to FIGS. 2-3. The input component 460 may further include the input gear 462. The input gear 462 may define the sun gear 454 such as described in regard to FIGS. 2-3.

The second rotatable component 402 further defines the output component 440 of the gear assembly 40. The output component 440 may generally include the output shaft 441, such as described in regard to FIGS. 4-5. The output component 440 may further include the output gear 442. In one embodiment, such as depicted in regard to FIG. 4, the output gear 442 may define the ring gear 451, such as described in regard to FIG. 2. In another embodiment, such as depicted in regard to FIG. 5, the output gear 442 may define the planet gear 452, such as described in regard to FIG. 3.

As generally shown in the embodiments in regard to FIGS. 4-5, the first frame 101 including the first mount member 111 is coupled to the first rotatable component 401 defining the input component 460 of the gear assembly 40. In one embodiment, the first rotatable component 401 defining, at least in part, the input shaft 461 may be coupled to the first frame 101 via the first mount member 111 and the bearing assembly 160. As further depicted in regard to FIGS. 4-5, the second frame 102 including the second mount member 112 is coupled to the second rotatable component 402 defining the output component 440 of the gear assembly 40. In one embodiment, the second rotatable component 402 defining, at least in part, the output shaft 441 may be coupled to the second frame 102 via the second mount member 112 and the bearing assembly 160.

Additionally, the second frame 102 including the third mount member 113 is coupled to the torque transfer component 403. As further depicted in regard to FIG. 2 and FIG. 4, the second frame 102 including the third mount member 113 is coupled to the torque transfer component 403 defining the carrier 453. In another embodiment, such as depicted in regard to FIG. 3 and FIG. 5, the second frame 102 including the third mount member 113 is coupled to the torque transfer component 403 defining the ring gear 451.

Referring still to FIGS. 4-5, the first frame 101 may generally define an input mount frame. The first mount member 111 may generally define an input mount member defining a stiffness $K_{input}$. The first mount member 111 defining the input mount member is coupled to the input component 460, such as described above. The second frame 102 may generally define an output mount frame. The second mount member 112 may generally define an output mount member defining a stiffness $K_{output}$. The second mount member 112 defining the output mount member is coupled to the output component 440, such as described above. The third mount member 113 defining a torque transfer mount member defining a stiffness $K_3$ is coupled to the torque transfer component 403 of the gear assembly 40 and to the second frame 102 defining the output mount frame. The stiffness $K_{input}$ of the first mount member 111 defining the input mount member is equal to or less than 10% of the stiffness $K_3$ of the third mount member 113 defining the torque transfer mount member. In various embodiments, a ratio of stiffness $K_{output}/K_3$ is between approximately 0.5 and approximately 2.0. In still various embodiments, second mount member 112 defining the output mount member, the third mount member 113 defining the torque transfer mount member, and the second frame 102 defining the output mount frame together define an overall stiffness at least ten times greater than the stiffness $K_{input}$ of the first mount member 111 defining the input mount member.

Embodiments of the mount arrangement including the first frame 101, the second frame 102, the gear assembly 40, and mounts 111, 112, 113 generally shown and described herein may be produced using one or more manufacturing methods known in the art, such as, but not limited to, via one or more processes known as additive manufacturing or 3D printing, machining processes, forgings, castings, etc., or combinations thereof, including unitary components or multiple components joined together via a bonding process (e.g., welding, brazing, adhesive, bonding, etc.), or mechanical fasteners (e.g., bolts, nuts, screws, rivets, tie rods, etc.), or other joining process. Alternatively, or additionally, various components of the engine 10 may be formed via a material removal process, such as, but not limited to, a machining process (e.g., cutting, milling, grinding, boring, etc.). Furthermore, the engine 10, or portions thereof, may be constructed of one or more materials suitable for gas turbine engines, including materials appropriate to define the desired stiffnesses $K_1$, $K_2$, $K_3$, $K_{input}$, and $K_{output}$, such as described herein. Such materials may include, but are not limited to, steel and steel alloys, nickel and nickel-based alloys, aluminum and aluminum alloys, titanium and titanium alloys, iron-based materials, composite materials (e.g., CMC, MMC, PMC materials, etc.), or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gas turbine engine, the engine comprising:
   a first frame comprising a first mount member defining a stiffness $K_1$;
   a second frame comprising a second mount member defining a stiffness $K_2$ and a third mount member defining a stiffness $K_3$, and
   a gear assembly comprising a first rotatable component, a second rotatable component, and a torque transfer component,
   wherein the first mount member is coupled to the first rotatable component, and
   wherein the second mount member is coupled to the second rotatable component, and
   wherein the third mount member is coupled to the torque transfer component, and
   wherein the stiffness $K_1$ is less than or equal to 10% of the stiffness $K_3$, and
   wherein a ratio of stiffness $K_2/K_3$ is greater than approximately 0.5 and less than approximately 2.0.

2. The engine of claim 1, wherein the first rotatable component of the gear assembly defines an input component providing torque to the gear assembly.

3. The engine of claim 2, wherein the second rotatable component of the gear assembly defines an output component receiving torque from the first rotatable component via the torque transfer component.

4. A gas turbine engine, the engine comprising:
   a first frame comprising a first mount member defining a stiffness $K_1$;
   a second frame comprising a second mount member defining a stiffness $K_2$ and a third mount member defining a stiffness $K_3$, and
   a gear assembly comprising a first rotatable component, a second rotatable component, and a torque transfer component,
   wherein the first mount member is coupled to the first rotatable component, and
   wherein the second mount member is coupled to the second rotatable component, and
   wherein the third mount member is coupled to the torque transfer component, and
   wherein the stiffness $K_1$ is less than or equal to 10% of the stiffness $K_3$, and
   wherein the second rotatable component of the gear assembly defines an input component providing torque to the gear assembly.

5. The engine of claim 4, wherein the first rotatable component of the gear assembly defines an output component receiving torque from the second rotatable component via the torque transfer component.

6. The engine of claim 4, wherein the gear assembly defines an epicyclic gear assembly.

7. The engine of claim 6, wherein the torque transfer component of the gear assembly defines a ring gear or a carrier gear generally stationary relative to a gear assembly centerline defined through an input component.

8. The engine of claim 7, wherein the input component comprises a sun gear.

9. The engine of claim 6, wherein the gear assembly defines an output component comprising a planet gear rotatable around a gear assembly centerline defined through an input component.

10. The engine of claim 4, further comprising:
    a turbine section coupled to the gear assembly, wherein the turbine section provides a motive force to rotate the first rotatable component and the second rotatable component.

11. The engine of claim 10, further comprising:
    a fan section coupled to the gear assembly, wherein the fan section receives the motive force from the first rotatable component and the second rotatable component.

12. The engine of claim 4, wherein the engine defines a turbofan, turboshaft, or turboprop configuration.

13. The engine of claim 4, wherein the first mount member is coupled to the first rotatable component and the second mount member is coupled to the second rotatable component each via a bearing assembly.

14. A gas turbine engine, the engine comprising:
    a turbine section;
    a fan section;
    a gear assembly comprising an input component rotatable around a gear assembly centerline, an output component rotatable around the gear assembly centerline, and a torque transfer component coupled to one or more of the input component or the output component, wherein the turbine section is coupled to the input component and the fan section is coupled to the output component;

an input mount frame comprising an input mount member defining a stiffness $K_{input}$, wherein the input mount member is coupled to the input component;

an output mount frame comprising an output mount member defining a stiffness $K_{output}$, wherein the output mount member is coupled to the output component; and a torque transfer mount member defining a stiffness $K_3$, wherein the torque transfer mount member is coupled to the torque transfer component, and further wherein the torque transfer mount member is coupled to the input mount frame, and wherein the stiffness $K_{output}$ of the output mount member is equal to or less than 10% of the stiffness $K_3$ of the torque transfer mount member.

15. The engine of claim 14, wherein a ratio of stiffness $K_{input}/K_3$ is between approximately 0.5 and approximately 2.0.

16. The engine of claim 14, wherein the input mount member, the torque transfer mount member, and the input mount frame together define an overall stiffness at least ten times greater than the stiffness $K_{output}$.

17. A gas turbine engine, the engine comprising:
a turbine section;
a fan section;
a gear assembly comprising an input component rotatable around a gear assembly centerline, an output component rotatable around the gear assembly centerline, and a torque transfer component coupled to one or more of the input component or the output component, wherein the turbine section is coupled to the input component and the fan section is coupled to the output component;
an input mount frame comprising an input mount member defining a stiffness wherein the input mount member is coupled to the input component;
an output mount frame comprising an output mount member defining a stiffness $K_{output}$, wherein the output mount member is coupled to the output component; and
a torque transfer mount member defining a stiffness $K_3$, wherein the torque transfer mount member is coupled to the torque transfer component, and wherein the torque transfer mount member is coupled to the output mount frame, and wherein the stiffness $K_{input}$ of the input mount member is equal to or less than 10% of the stiffness $K_3$ of the torque transfer mount member, and wherein a ratio of stiffness $K_{output}/K_3$ is between approximately 0.5 and approximately 2.0.

18. A gas turbine engine, the engine comprising:
a turbine section;
a fan section;
a gear assembly comprising an input component rotatable around a gear assembly centerline, an output component rotatable around the gear assembly centerline, and a torque transfer component coupled to one or more of the input component or the output component, wherein the turbine section is coupled to the input component and the fan section is coupled to the output component;
an input mount frame comprising an input mount member defining a stiffness $K_{input}$, wherein the input mount member is coupled to the input component;
an output mount frame comprising an output mount member defining a stiffness $K_{output}$, wherein the output mount member is coupled to the output component; and
a torque transfer mount member defining a stiffness $K_3$,
wherein the torque transfer mount member is coupled to the torque transfer component, and
wherein the torque transfer mount member is coupled to the output mount frame, and
wherein the stiffness $K_{output}$ of the input mount member is equal to or less than 10% of the stiffness $K_3$ of the torque transfer mount member, and
wherein the output mount member, the torque transfer mount member, and the output mount frame together define an overall stiffness at least ten times greater than the stiffness $K_{input}$.

* * * * *